(12) United States Patent
Ip et al.

(10) Patent No.: US 9,838,444 B2
(45) Date of Patent: Dec. 5, 2017

(54) SYSTEMS AND METHODS FOR DYNAMICALLY PROVIDING FONTS BASED ON LANGUAGE SETTINGS

(71) Applicant: Google Inc., Mountain View, CA (US)

(72) Inventors: Isabella Ip, New York, NY (US); Luiz Amaral Franca Pereira Filho, Jersey City, NJ (US); Hironori Bono, Tokyo (JP); Clayton Williams, New York, NY (US); Jeff Scott Harris, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 13/784,179

(22) Filed: Mar. 4, 2013

(65) Prior Publication Data

US 2013/0326348 A1    Dec. 5, 2013

Related U.S. Application Data

(60) Provisional application No. 61/653,671, filed on May 31, 2012.

(51) Int. Cl.
| | | |
|---|---|---|
| *G06F 17/00* | (2006.01) | |
| *H04L 29/06* | (2006.01) | |
| *G06F 17/21* | (2006.01) | |
| *G06F 17/22* | (2006.01) | |
| *G06F 17/30* | (2006.01) | |

(52) U.S. Cl.
CPC .......... *H04L 65/403* (2013.01); *G06F 17/214* (2013.01); *G06F 17/2223* (2013.01); *G06F 17/3087* (2013.01); *G06F 17/30899* (2013.01); *G06F 17/30905* (2013.01)

(58) Field of Classification Search
CPC .................................................... G06F 17/214
USPC .......................................................... 715/269
See application file for complete search history.

(56) References Cited

U.S. PATENT DOCUMENTS

| | | |
|---|---|---|
| 5,361,332 A | 11/1994 | Yoshida et al. |
| 5,539,428 A | 7/1996 | Bril et al. |
| 5,586,242 A | 12/1996 | McQueen et al. |
| 5,675,718 A | 10/1997 | Miller |
| 6,623,529 B1 * | 9/2003 | Lakritz ............... G06F 17/2288 707/E17.109 |

(Continued)

FOREIGN PATENT DOCUMENTS

WO    0046693 A2    8/2000

OTHER PUBLICATIONS

"Adobe Reader X Font Packs—extended languages", Aug. 10, 2012, downloaded from URL: http://www.adobe.com/support/downloads/detail.jsp?ftpID=4885, 5 pages.

(Continued)

*Primary Examiner* — Andrew McIntosh
(74) *Attorney, Agent, or Firm* — Lerner, David, Littenberg, Krumholz & Mentlik, LLP

(57) ABSTRACT

A server dynamically provides fonts to a user device. The user device is provided with access to a document via a network. An update to a language parameter associated with the document is detected. Fonts associated with the update to the language parameter are determined. It is determined at least one of the fonts is not available on the user device. The at least one of the fonts is provided to the user device.

8 Claims, 9 Drawing Sheets

(56) References Cited

U.S. PATENT DOCUMENTS

| | | |
|---|---|---|
| 2002/0196468 A1 | 12/2002 | Klassen et al. |
| 2005/0193336 A1* | 9/2005 | Fux et al. .................... 715/542 |
| 2007/0162942 A1* | 7/2007 | Hamynen ............... G06F 3/147 |
| | | 725/105 |
| 2009/0183069 A1 | 7/2009 | Duggan et al. |
| 2010/0030549 A1* | 2/2010 | Lee et al. ......................... 704/4 |
| 2010/0231598 A1* | 9/2010 | Hernandez ............ G06F 17/214 |
| | | 345/471 |
| 2011/0126191 A1 | 5/2011 | Hughes et al. |
| 2011/0188761 A1 | 8/2011 | Boutros et al. |
| 2011/0252312 A1 | 10/2011 | Lemonik et al. |
| 2012/0066590 A1 | 3/2012 | Harris et al. |
| 2012/0233543 A1 | 9/2012 | Vagell et al. |
| 2013/0179145 A1* | 7/2013 | Patel et al. ........................ 704/3 |
| 2013/0215126 A1 | 8/2013 | Roberts |

OTHER PUBLICATIONS

"MAC101: Font Book", Oct. 18, 2012, downloaded from URL: http://support.apple.com/kb/HT2509, 2 pages.

Communication Relating to the Results of the Partial International Search for PCT Application No. PCT/US2013/042073, dated Sep. 3, 2013, 2 pages.

* cited by examiner

| Locale Code | Language Name |
|---|---|
| ar | Arabic |
| bg | Bulgarian |
| ca | Catalan |
| zh-CN | Chinese (Simplified) |
| zh-TW | Chinese (Traditional) |
| hr | Croatian |
| cs | Czech |
| da | Danish |
| nl | Dutch |
| en | English |
| fi | Finnish |
| fr | French |
| de | German |
| el | Greek |
| iw | Hebrew |
| hi | Hindi |
| hu | Hungarian |
| id | Indonesian |
| it | Italian |
| ja | Japanese |
| ko | Korean |
| lv | Latvian |
| lt | Lithuanian |
| no | Norwegian |
| pl | Polish |
| pt | Portuguese |
| ro | Romanian |
| ru | Russian |
| sr | Serbian |
| sk | Slovak |
| sl | Slovenian |
| es | Spanish |
| sv | Swedish |
| th | Thai |
| tr | Turkish |
| uk | Ukrainian |
| vi | Vietnamese |

FIG. 7

SYSTEMS AND METHODS FOR DYNAMICALLY PROVIDING FONTS BASED ON LANGUAGE SETTINGS

CROSS REFERENCE TO RELATED APPLICATIONS

This application claims benefit, pursuant to 35 U.S.C. §119(e), of U.S. Provisional Application Ser. No. 61/653,671 filed May 31, 2012, which is hereby incorporated herein by reference in its entirety.

TECHNICAL FIELD

This application relates generally to systems, methods and apparatus for dynamically providing fonts based on language settings and more particularly to systems, methods and apparatus for dynamically providing fonts based on language settings for users accessing an online document.

BACKGROUND

Web fonts provide users with the ability to view online content on webpages. The content may be rendered using various web fonts that provide users with rich and robust text in order to view the content exactly as it was meant to be viewed using the web fonts selected by the webpage developer. Web fonts are also used to render text in different languages so that users may properly view the text.

When users view a webpage, the text on the webpage is rendered using the fonts available on the users' devices. If the font that is needed to render the text on the webpage is available to a user's device (e.g., the font is stored locally), the user may view the text as it was intended to be viewed, as determined by the webpage developer. If however, the font is not available to the user's device, the user's device may not be able to provide any readable text to the user. Alternatively, the user's device may use a default font to render the text.

Furthermore, if a first user, located in a first location, wishes to send to a second user, located in a second location, a document containing text in a first language, the second user may not be able to view the second document properly if the second user does not have fonts associated with the first language installed locally.

SUMMARY

In accordance with an embodiment, a user device is provided access to a document, via a network. An update to a language parameter associated with the document is detected. Fonts associated with the update to the language parameter are determined. It is determined at least one of the fonts is not available on the user device. The at least one of the fonts is provided to the user device.

In an embodiment, the step of detecting the update to the language parameter is in response to at least one of: receiving an indication of a locale of the user device; receiving document language settings of the online document; receiving an indication of a language associated with the online document; and receiving contents of the online document.

In an embodiment, the language parameter is associated with one or more languages associated with the document.

In an embodiment, the step of providing the at least one of the fonts to the user device comprises providing a font file associated with the at least one of the fonts, wherein the font file comprises a set of glyphs, characters, or symbols.

In an embodiment, the step of determining that at least one of the fonts is not available on the user device further comprises comparing the fonts to a list of stored fonts stored on a font list of the user device. In an embodiment, an updated font list is received that includes the least one of the fonts.

In an embodiment, one of the following is performed. A second indication of a second locale of the user device is received. A second indication of a second update to the language parameter associated with the document is detected. New fonts associated with the update to the language parameter are determined. It is determined that at least one of the second fonts is not available on the user device. At least one of the second fonts is provided to the user device.

In accordance with an embodiment, an apparatus includes a processor and a memory that is communicatively coupled to the processor. The memory stores computer program instructions. The computer program instructions when executed on the processor cause the processor to perform the following operations. A user device is provided access to a document, via a network. An update to a language parameter associated with the document is detected. Fonts associated with the update to the language parameter are determined. It is determined at least one of the fonts is not available on the user device. The at least one of the fonts is provided to the user device.

In accordance with an embodiment, a computer readable medium stores computer program instructions, which, when executed on a processor, cause the processor to perform the following operations. A user device is provided access to a document, via a network. An update to a language parameter associated with the document is detected. Fonts associated with the update to the language parameter are determined. It is determined at least one of the fonts is not available on the user device. The at least one of the fonts is provided to the user device.

These and other advantages of the present disclosure will be apparent to those of ordinary skill in the art by reference to the following Detailed Description and the accompanying drawings.

BRIEF DESCRIPTION OF THE DRAWINGS

FIG. 7 depicts an exemplary list of available languages, in accordance with an embodiment;

DETAILED DESCRIPTION

Figure 1:
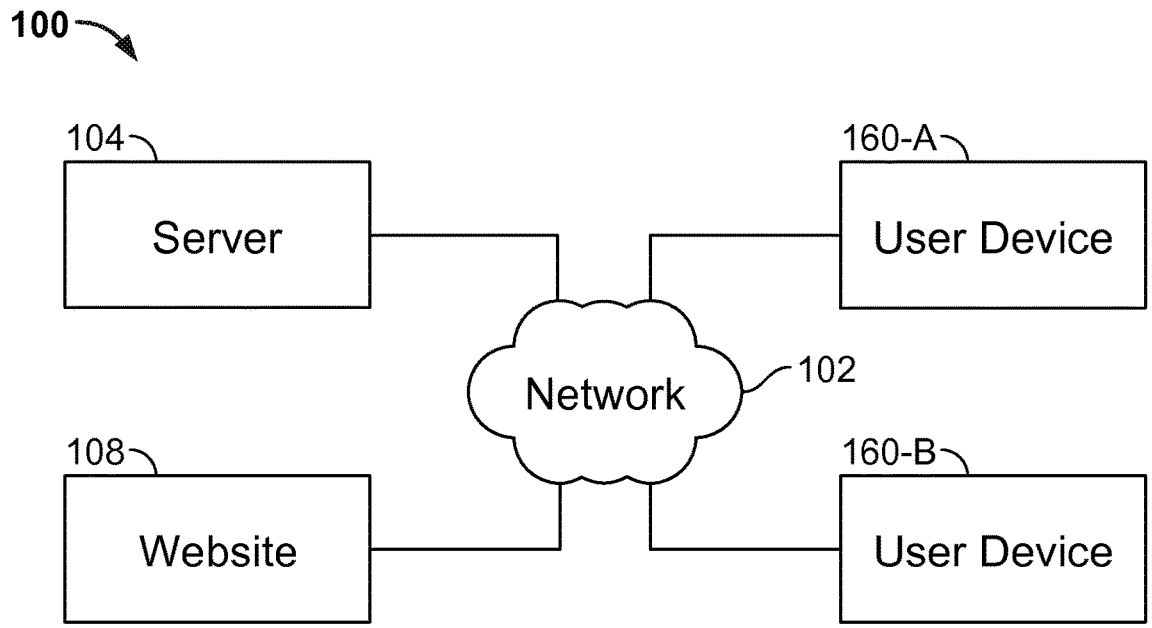
FIG. 1 depicts a communication network that may be used to provide document services, in accordance with an embodiment.

FIG. 1 shows a communication system 100 that may be used to provide document services in accordance with an embodiment. Communication system 100 includes a network 102, a server 104, and user devices 106-A, 106-B, etc. For convenience, the term "user device 106" is used herein to refer to any one of user devices 106-A, 106-B, etc. Accordingly, any discussion herein referring to "user device 106" is equally applicable to each of user devices 106-A, 106-B, etc. Communication system 100 may include more or fewer than two user devices.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 102 may include a combination of different types of networks.

In one embodiment, server 104 may include a collaborative development service and therefore, the terms server 104 and a collaborative development server may be herein used interchangeably. In one embodiment, server 104 may host a website 108 that can be accessed by user devices 106-A and 106-B. In an alternative embodiment, website 108 may be hosted by a different server. Server 104 via website 108 provides user devices 106-A and 106-B access to various webpages. In one embodiment, website 108 provides to user devices 106-A and 106-B access to one or more webpages displaying a document. Documents may be related to a variety of different content types, including, without limitation, text documents, spreadsheets, drawings, photographs, images, video files, music or audio files, designs, etc. or a combination of these content types. User devices 106-A and 106-B may access a World Wide Web page on website 108 that may be viewed using a conventional Web browser, for example. In one embodiment, multiple users employing respective user devices 106-A and 106-B may access website 108 to collaboratively view and/or edit a document.

In certain embodiments, collaborative document editing services are provided to multiple users of multiple user devices. User devices 106-A and 106-B may each be any device that enables a user to view website 108 via network 102. User devices 106-A and 106-B may each be connected to network 102 through a direct (wired) link or wirelessly. User devices 106-A and 106-B may each have a display screen for displaying information. In the illustrative embodiment, user device 106-B is a personal computer. In other embodiments, user device 106-B may be any of a variety of devices including a laptop computer, a workstation, a mainframe computer, etc. In the illustrated embodiment, user device 106-A is a wireless phone. In other embodiments, user device 106-A may be any of a variety of devices including a personal digital assistant, cellular device, a laptop computer, a netbook, a tablet device, a book reader etc. Other devices may be used.

Figure 2:
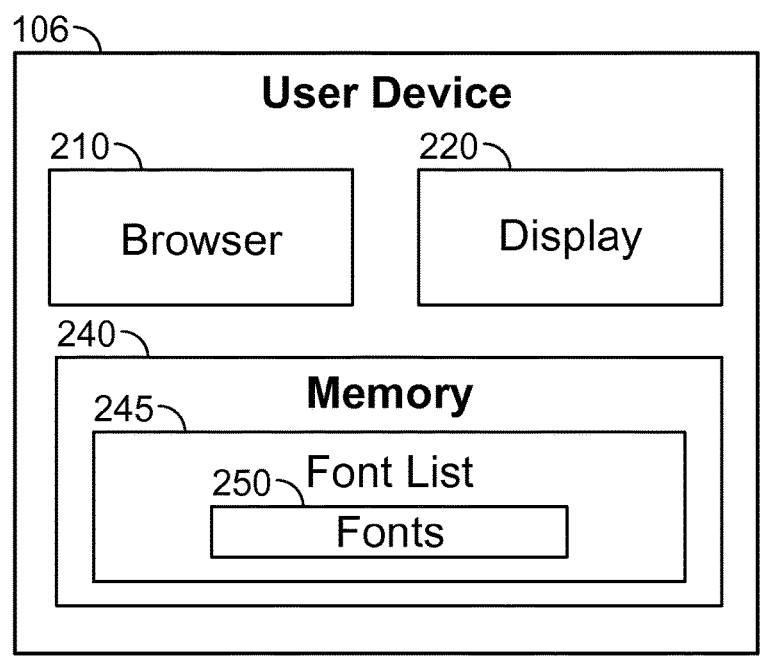
FIG. 2 depicts functional components of an exemplary user device, in accordance with an embodiment.

FIG. 2 depicts functional components of an exemplary user device 106, in accordance with an embodiment. User device 106 includes a web browser 210, a display 220, and a memory 240. Web browser 210 may be a conventional web browser used to access World Wide Web sites via the Internet, for example. Display 220 displays software applications, documents, images, webpages, and other information. For example, all or a portion of a document that a user creates or edits may be displayed on display 220. Memory 240 includes a font list 245 which includes one or more fonts 250 stored on user device 106. These fonts are stored locally and used to render text for display on user device 106. In another embodiment, font list 245 may not include fonts 250 (stored external to font list 245). Rather, font list 245 may only provide a list of all available fonts on user device 106.

Figure 3:
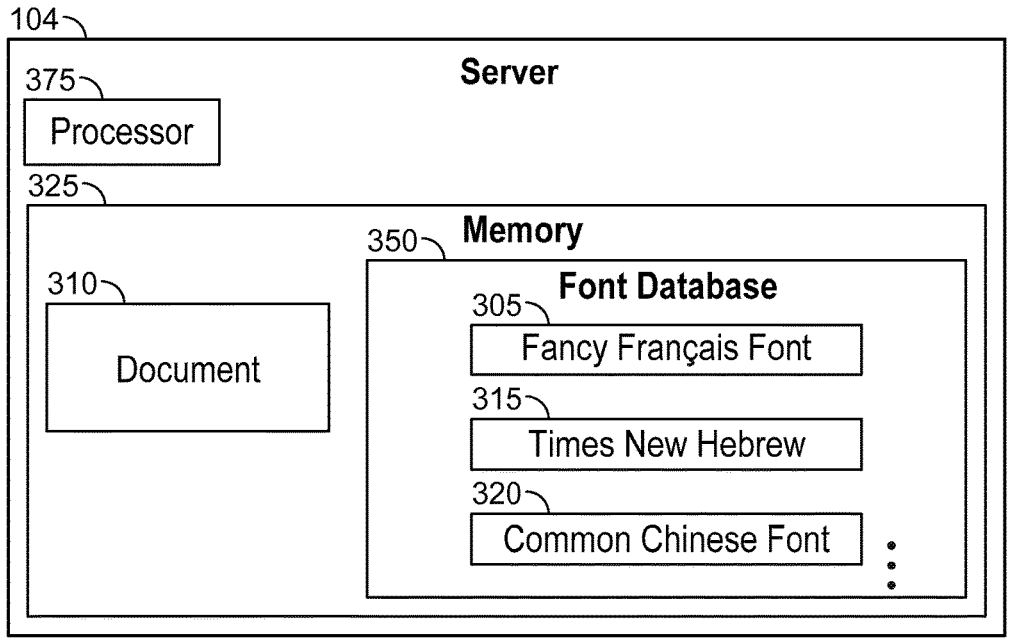
FIG. 3 depicts functional components of a server, in accordance with an embodiment.

FIG. 3 shows functional components of a server in accordance with an embodiment. A server 104 includes a processor 375 and a memory 325. Memory 325 includes a document 310 and a font database 350. Font database 350 may include several fonts (e.g., Fancy Français Font 305, Times New Hebrew 315, and Common Chinese Font 320). Font database 350 may include a database of fonts in all available languages that can be supplied to user device 106. In another embodiment, font database 350 may be located external to server 104 (not shown) and can be accessed by server 104. Server 104 may include other components not shown in FIG. 3.

In accordance with the embodiment of FIG. 1, server 104 provides access to software applications including word processing applications, spreadsheet applications, drawing tools, photo or image editing applications, video editing applications, design tools, software development tools, audio or music editing applications, games, software applications having a shared user space, etc. Server 104 provides document 310 to user device 106.

As one or more user devices access online documents on a word processor, access to fonts may be needed. For example, suppose that a user employing user device 106 accesses documents stored at a server (e.g., server 104) via network 102. The server allows simultaneous access to the documents to other users in a collaborative development environment. Suppose that the user is accessing a document containing Japanese character sets and requires Japanese language fonts to properly view the contents of the document. The user may use web fonts in order to view the Japanese character sets.

Many web applications may use fonts that are not necessarily available on the user's machine. Web fonts are the most common technology using fonts which may not be available (e.g., may not be stored locally on a user's machine). Loading all potential fonts may not be practical because of the total size of those resources. For example, when using a mobile device, it may be not practical to download all fonts when only a few are needed. Therefore, fonts that are likely to be used may be selectively loaded onto the user's machine.

Web fonts include fonts hosted by a service provider that can be accessed by users to view, render, or create characters. For example, a service provider may enable a user to access and download selected web fonts onto the user's computer.

In various embodiments, the user may be accessing documents in an online mode or an offline mode. In an embodiment, the user may be accessing documents in an online mode and then switch to an offline mode. In an embodiment, the user may be accessing documents in a collaborative environment. The user may be using a personal computer, a laptop computer, a workstation, a mainframe computer, a mobile communication device such as a wireless phone, a personal digital assistant, a cellular device, a laptop computer, a netbook, a tablet device, an electronic book reader etc. Other devices may be used.

Specifically, the user may request access to a Japanese character font set from a server in real-time as needed when accessing the document. The server receives the request via network 102, and in response to receiving the request for the Japanese character font set may provide the user's device with the Japanese character font set. The device may then permanently or temporarily cache a local copy of the Japanese character font set. Details regarding obtaining fonts in a dynamic fashion, as needed, are described herein.

Selection of Fonts Based on Languages

In one embodiment, one or more fonts are selected and provided to a user's device based on a language that the user uses. For example, a user accessing a particular document stored at the server may select a menu of language options displayed on the user's device, and select a particular language from the menu of language options. The selection is transmitted by the user device to the server via a network. At the server, the selection of a language option is received. In response, the server identifies a set of fonts related to the selected language. For example, the server may access a database of fonts and identify one or more fonts related to the particular language. The identified set of fonts may include, for example, a limited number of fonts related to the particular language selected by the user. The server transmits the identified set of fonts to the user device. The user device receives the set of fonts and stores the set of fonts in local storage. The user device may then make the set of fonts available to the user. The user device may apply the set of fonts to the document. The selection of language may be automatic (e.g., based on a location of the user device, based on properties associated with a document the user is accessing, etc.) or may be manual. In one embodiment, server may inform user device of the font, and user device may need to request the font.

In another embodiment, the user device may determine which sets of fonts are required for downloading from the server. That is, the user device includes software and/or hardware to determine which sets of fonts are related to the selected language. For example, the user device may access a list of all fonts available to the server and identify one or more fonts on the list related to the particular language selected by the user. The user device then transmits a request for the set(s) of required fonts to the server. The server then transmits the requested set(s) of fonts to the user device. The user device receives the set(s) of fonts, stores the set(s) of fonts in local storage, and may then apply the set(s) of fonts to the document.

Users may access a document, webpage, etc. from a particular geographic location. The locale of the user may be the user's geographic location, the user's set region/country/location or relate to a particular language/region, etc. Suppose that only fonts that are appropriate for a language that the user is using are to be shown. It may not be useful for the user to see or apply fonts that do not have glyphs for the character set of the language they are typing in. Therefore, the user may be dynamically provided with fonts based on either, or some combination of, the particular document's language setting, the user's language setting, or the system's language setting. In an embodiment, the locale of the user may be automatically detected or set to a default language. For example, if the user's location is in France, the system's default language setting may be French. The user may need to access a font entitled Fancy Français Font 305 in order to read and/or write to a document.

Figure 4:
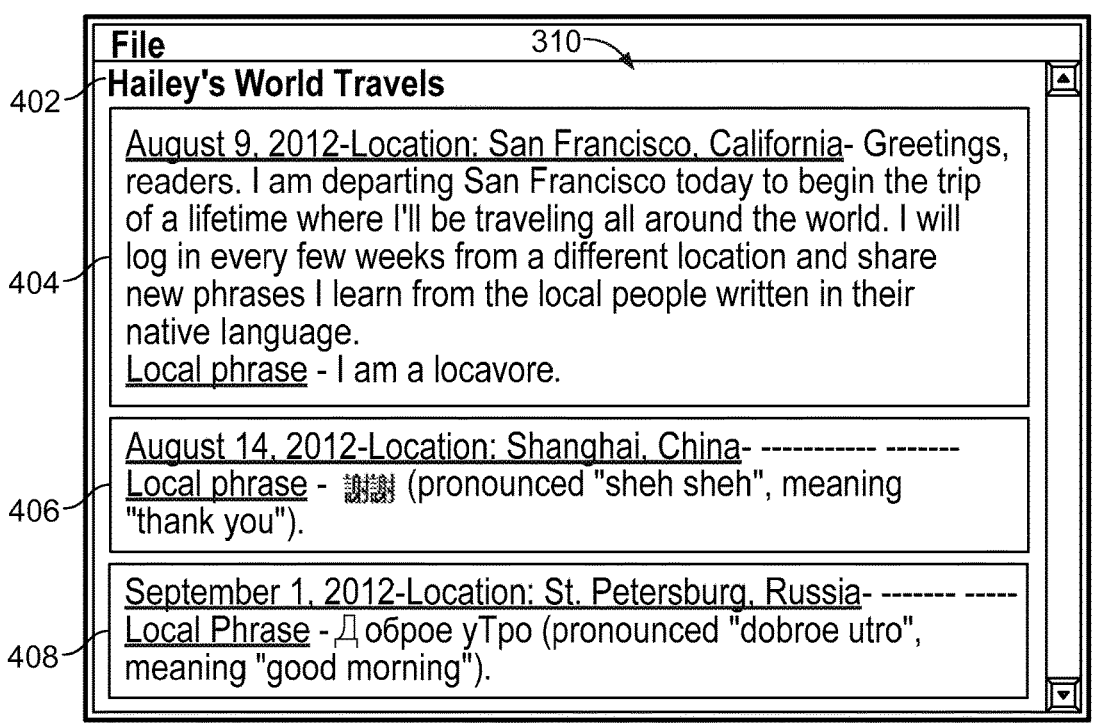
FIG. 4 depicts of a view of a document, in accordance with an embodiment.

FIG. 4 depicts a view of an electronic document, according to an embodiment. A view 400 provides a view of document 310, displayable to a user employing user device 106. View 400 may be displayed within a graphical user interface on display 220 of user device 106. Document 310 may be created using a software application including a document processor, an image processor, a spreadsheet processor, a presentation processor, etc. Document 310 depicted by FIG. 4 may be any kind of electronic document, including a text document, a word processing document, an image, a video, a spreadsheet, a presentation, or a combination of documents. Suppose now that a user named Hailey employing user device 106 creates document 310. Document 310 is stored on server 104. A copy of document 310 may also be stored locally on user device 106, so that user device 106 can access document 310 locally, when user device 106 is offline. Suppose now that Hailey wishes to create a document named Hailey's World Travels 402 to store information about her world travels. As Hailey travels, she documents information about each location she visits in document 310.

In an entry 404 dated Aug. 9, 2012, Hailey inserts a paragraph into document 310. Hailey types onto user device 106 the text to be entered into 404. Hailey may enter the text using any of a variety of methods including typing on a keyboard, speaking into a microphone included in user device 106 that converts the speech into text, etc. User device 106 may store a local copy of the entered text into memory 240. As described above, a local copy of document 310 may also be stored in memory 240 on user device 106.

When server 104 receives the text entered by Hailey using user device 106, via network 102, server 104 saves the text in memory 325. Hailey may then view the text using user device 106. In an embodiment, user device 106 may provide a location (e.g., a Global Positioning System (GPS) location) of user device 106 to server 104. In the illustrative embodiment of FIG. 4, this location may be San Francisco. User device 106 may provide a very specific current location to server 104. For example, user device 106 may inform server 104 that the current location of user device 106 is at terminal X, gate 2 at San Francisco airport. User device 106 may use a variety of methods to determine the current location (e.g., a GPS, cell tower triangulation, Internet protocol (IP) address of a local wireless access network, etc.).

In an embodiment, user device 106 may provide the contents of font list 245 to server 104 so that server 104 can determine which fonts 250 are available to user device 106.

Suppose now that Hailey travels to Shanghai, China on Aug. 14, 2012. Hailey may wish to create an entry 406 during her visit to China. In an embodiment, Hailey may employ user device 106 (e.g., a laptop, a smartphone, etc.) which is the same user device she used to enter entry 404. In another embodiment, Hailey may utilize a different device. For example, Hailey may visit an Internet café in China to connect with server 104 in order to create the new entry into document 310.

In an embodiment, when Hailey connects and/or logs in to server 104 to access document 310, a location associated with the device used to log in may be provided to server 104. Server 104 then determines that Hailey is located in Shanghai, China. The change in Hailey's location alerts server 104 to determine whether any new fonts are associated with the new location that Hailey's user device may not have access to. For example, if Hailey is using user device 106 to connect to server 104, server 104 checks the contents of font list 245. Server 104 may determine that Chinese style fonts are missing from the list of fonts 250 that are available to user device 106. Server 104 then alerts user device 106 of the missing Chinese style fonts. User device 106 may then request the Chinese style fonts from server 104. In response to the request, server 104 accesses font database 350 to access Common Chinese Font 320 and then provides Common Chinese Font 320 to user device 106.

In another embodiment, suppose that Hailey accesses document 310 stored on server 104 using another device, which contains Chinese style fonts. In this embodiment, server 104 may determine that the other device already has access to Chinese style fonts and does not need to provide any new fonts to the device.

In entry 406, Hailey uses Common Chinese Font 320 to type the characters ▨▨. As user device 106 has installed Common Chinese Font 320 and stores it onto memory 240, Hailey may use Common Chinese Font 320 to render text.

Suppose now that Hailey visits St. Petersburg, Russia and creates entry 408. When Hailey accesses document 310, server 104 receives Hailey's new location and determines that user device 106 does not have Russian fonts installed. Server 104 alerts user device 106, and user device 106 requests Russian fonts. Server 104 then transmits the new Russian fonts to user device 106 so that Hailey can type text into document 310 that can be rendered using the Russian language fonts. In another embodiment, server 104 may transmit only a list of the new Russian fonts (and not the actual font files) to user device 106. User device 106 may check the fonts in font list 245 to determine whether the new Russian fonts are required. If user device 106 determines that the new Russian fonts are required and are not available on font list 245, user device 106 may request the new Russian fonts from server 104.

Figure 6:
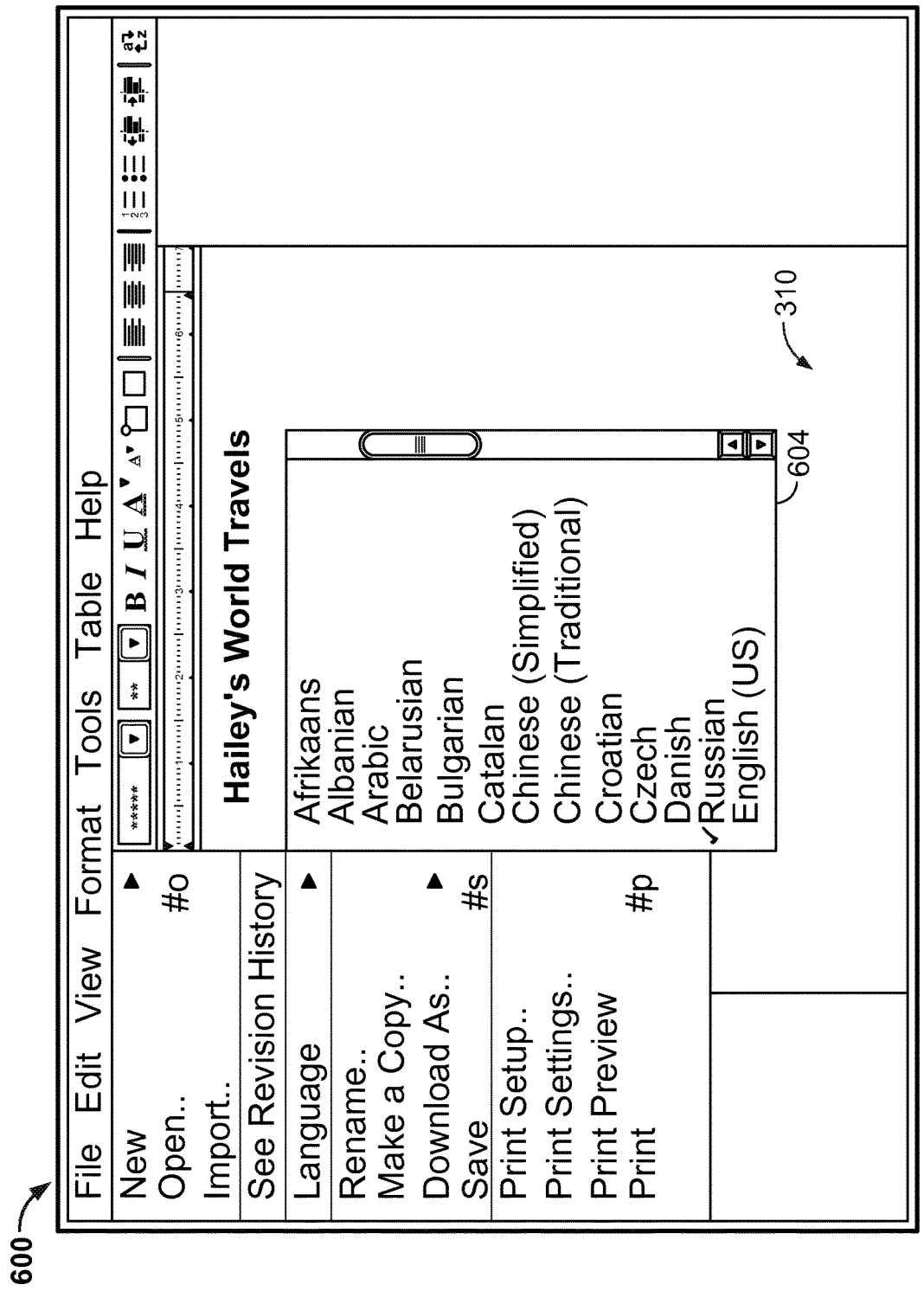
FIG. 6 depicts a view of language settings, in accordance with an embodiment.

In another embodiment, suppose now that Hailey does not log entry 408 until she returns to her home in San Francisco. Although Hailey (or Hailey's device) is not physically located in Russia, Hailey may still access Russian fonts. In an embodiment, Hailey may access document 310's properties in a view 600, as depicted in FIG. 6. View 600 provides a view of document 310, displayable to a user employing user device 106. View 600 may be displayed within a graphical user interface on display 220 of user device 106. Hailey may then change the document language settings using a drop down menu 604 and select Russian. User device 106 would then provide the change in language settings to server 104. Server 104 makes a determination that Russian language fonts are not available to user device 106 and informs user device 106 of this. User device 106 may then request the Russian language fonts from server 104. Hailey may then type text using Russian language fonts.

Referring now to FIG. 1, details regarding how server 104 determines whether or not user device 106 has a specified font are described. In one embodiment, in order to make the determination, server 104 communicates with user device 106 which selects an element, measures the width of the element and compares the width of the element with an expected width of the specified font. When a web service specifies two or more fonts in an HTML element, a browser on user device 106 chooses a font that can render all characters in the element.

For example, suppose that a user wishes to use a first font to render the text "abcdefghi . . . z." A browser on the user's device detects that the first font is not installed/cached/downloaded/stored on the user's device. However, a second font is installed and available for use by the user's device. The browser then makes a substitution and uses a second font to render the text "abcdefghi . . . z," instead of using the first font to render the text.

When the first font is not available, a fallback font may be used instead. In selecting which font to substitute for the unavailable first font (i.e. the second font), the browser makes the following determination. The text width of "abcdefghi . . . z" when rendered using the first font must be equal to the text width of "abcdefghi . . . z" when rendered using the second font. If the text width of the text when rendered using the first font is equal (or substantially equal or within a preset range, e.g., off by 3%, etc.) to the text width of the text rendered using the second font, then the user device may make the substitution described above.

If, however, the text width of the text when rendered using the first font is not equal to (or not substantially equal to or not within a present range of) the text when rendered using the second font, the user device determines that the first font must be used and no substitution should be made. That is, if the width of the text (or some sample text) rendered using the first font is not equal to the width of the text rendered using the second font, the user device does not use substitute the text using the second font. Instead the user device determines that the first font should instead be installed and/or downloaded from the server.

Server 104, in communication with user device 106, via network 102, can make a determination as to whether or not to install the first font on user device 106 using the following steps. In an alternate embodiment, user device 106 may make the determination.

Two HyperText Markup Language (HTML) elements for the text "abcdefghi . . . z" rendered using the first font and the second font are determined;

When the width of the text rendered using the first font is equal to the width of the text rendered using the second font, the firsts font is not installed to the user device;

When the width of the text rendered using the first font is not equal to the width of the text rendered using the second font, it is determined that the first font should be installed and the first font is downloaded to the user device.

The above steps may also be used for determining whether a font has a certain glyph. For example, suppose that a user is in France and has set the language settings to French. When the server wishes to determine if a third font contains a glyph for French ligature "oe", the server determines two elements including the ligature. The first element uses a first font family: "font-family: third_font, fourth-_font;" and the second element uses a second font family: "font-family: fourth_font;". The server determines that if the width of the text "oe" rendered using the first font family is equal to the width of the text "oe" rendered using the second font family, the third font does not have the glyph. In another embodiment, the determination of whether a font has a certain glyph may be made by the user device or the user device in combination with the server.

Most applications may show all fonts available and may not filter based on settings. An alternative would be to either show all fonts available for the application, browser, or system and/or have the user choose a font that does not have glyphs for the character set of the language the user is typing in (e.g., French). For example, if the user only has access to only Spanish and English fonts saved on the user's device, the user may either see a dummy character for the French words/characters/symbols, etc. or some default font may be used to view the document. Other applications may list all the fonts on a user's system and create a separate category with just a subset of the ones specific to the system language. Other applications may provide a way to manage the font files on a computer while the present disclosure provides for making different sets of fonts available to use within an application.

Figure 5:
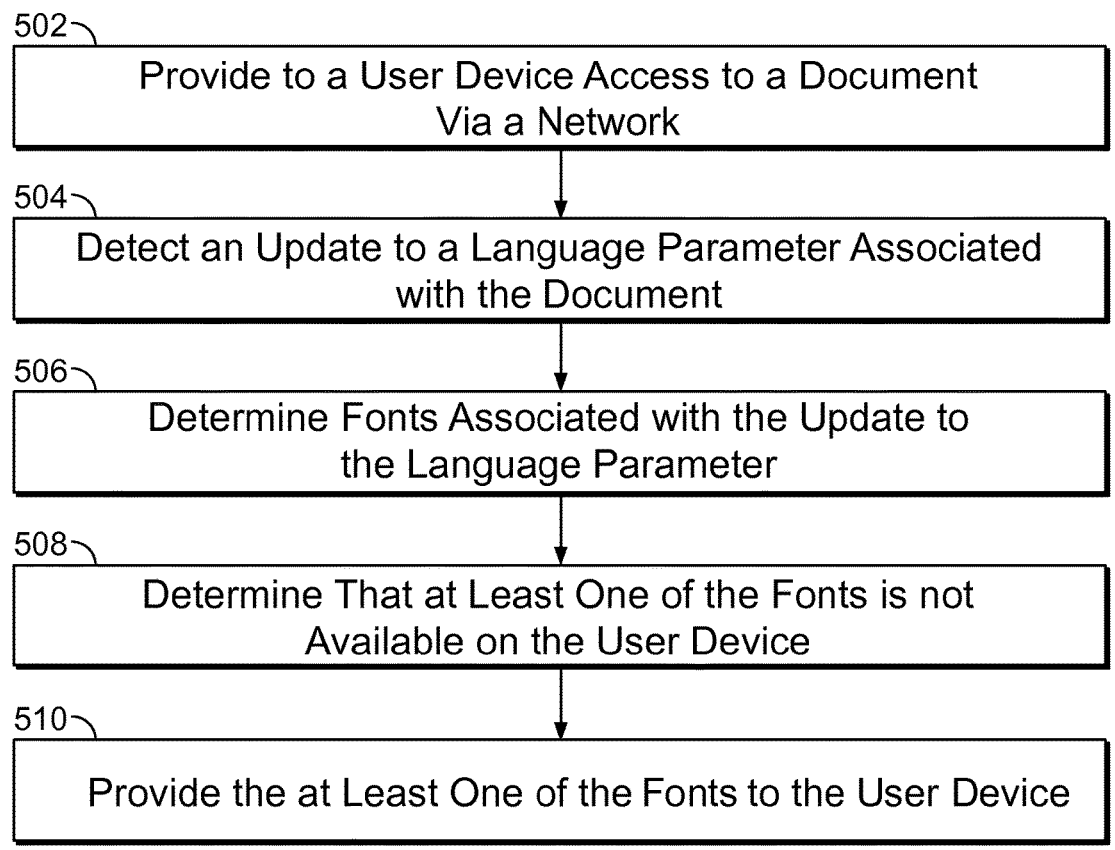
FIG. 5 is a flowchart of a method for providing fonts to a user based on location, in accordance with an embodiment.

FIG. 5 is a flowchart of a method for providing fonts to a user based on location, in accordance with an embodiment.

At step 502, a user device is provided access to a document via a network. User device 106 is provided access to document 310 via network 102, by server 104. Server 104 provides a user employing user device 106 with access to document 310, should the user wish to create a new document or view or edit an existing document. Server 104 may require a login name and password prior to allowing the access to the user.

At step 504, an update to a language parameter associated with the document is detected. Server 104 detects an update to a language parameter associated with document 310. A language parameter of document 310 indicates language(s) associated with document 310. For example, server 104 may receive location information from user device 106. Upon receiving location information from user device 106 (e.g., where the location information is determined using a GPS, etc.), server 104 may determine that the location of user device 106 has changed since the last time user device 106 had accessed document 310. In response to receiving the updated location, server 104 determines that an update to the language parameter associated with document 310 is needed. The language parameter may have previously been set to the English language and the update may set the language parameter to the French language. Server 104 may associate one or more locations with a language, and/or associated one or more fonts with the language. For example, the French language may be associated with locations (e.g., France, French Polynesia, Canada, etc.) and have associated fonts (e.g., Fancy Français Font 305). In an embodiment, the document itself may be set to a particular language that has fonts associated with that language.

In an embodiment, a location may be associated with multiple languages and/or multiple fonts. For example, if user device 106, located in Switzerland, sends its location to server 104, server 104 may determine that the update to the language parameter requires multiple fonts in multiple languages (e.g., French, Italian, German, and Romansh).

At step 506, fonts associated with the update to the language parameter are determined. Server 104 determines fonts associated with the update to the language parameter. For example, if the update to the language parameter includes the French language, server 104 determines that Fancy Français Font 305 is associated with the update to the language parameter.

At step 508, it is determined that at least one of the fonts is not available on user device 106. Server 104 determines that at least one of the fonts (e.g., Fancy Français Font 305) is not available on user device 106. Server 104 may, for example, compare Fancy Français Font 305 to fonts 250 in font list 245, received from user device 106, to determine if Fancy Français Font 305 is listed on font list 245.

At step 510, server 104 provides the at least one of the fonts to the user device. Server 104 provides Fancy Français Font 305 to user device 106, in response to determining that user device 106 does not have access to Fancy Français Font 305. The step of providing the at least one of the fonts to user device 106 includes providing a font file wherein the font file includes a set of glyphs, characters, or symbols.

User device 106 stores locally a copy of Fancy Français Font 305 (e.g., in font list 245). User device 106 may then type and/or view French language text in document 310. French text is rendered using Fancy Français Font 305 and displayed to the user.

Upon downloading Fancy Français Font 305, user device 106 may update font list 245 to include Fancy Français Font 305 in fonts 250. Server 104 may receive an updated font list including Fancy Français Font 305 from user device 106. In this way, server 104 stores an updated list of fonts that are available to user device 106. In an embodiment, when user device 106 changes locations, the steps listed in FIG. 5 may be repeated.

An example of a list of available languages is provided in FIG. 7, in accordance with an embodiment.

Although the above description of FIG. 5 describes the server performing the steps of FIG. 5, in accordance with an embodiment, one or more of steps 502, 504, 506, 508, or 510 may be performed by user device 106. For example, user device 106 may use logic stored therein to determine which fonts are required by user device 106 and then request those fonts from server 104.

Figure 8:
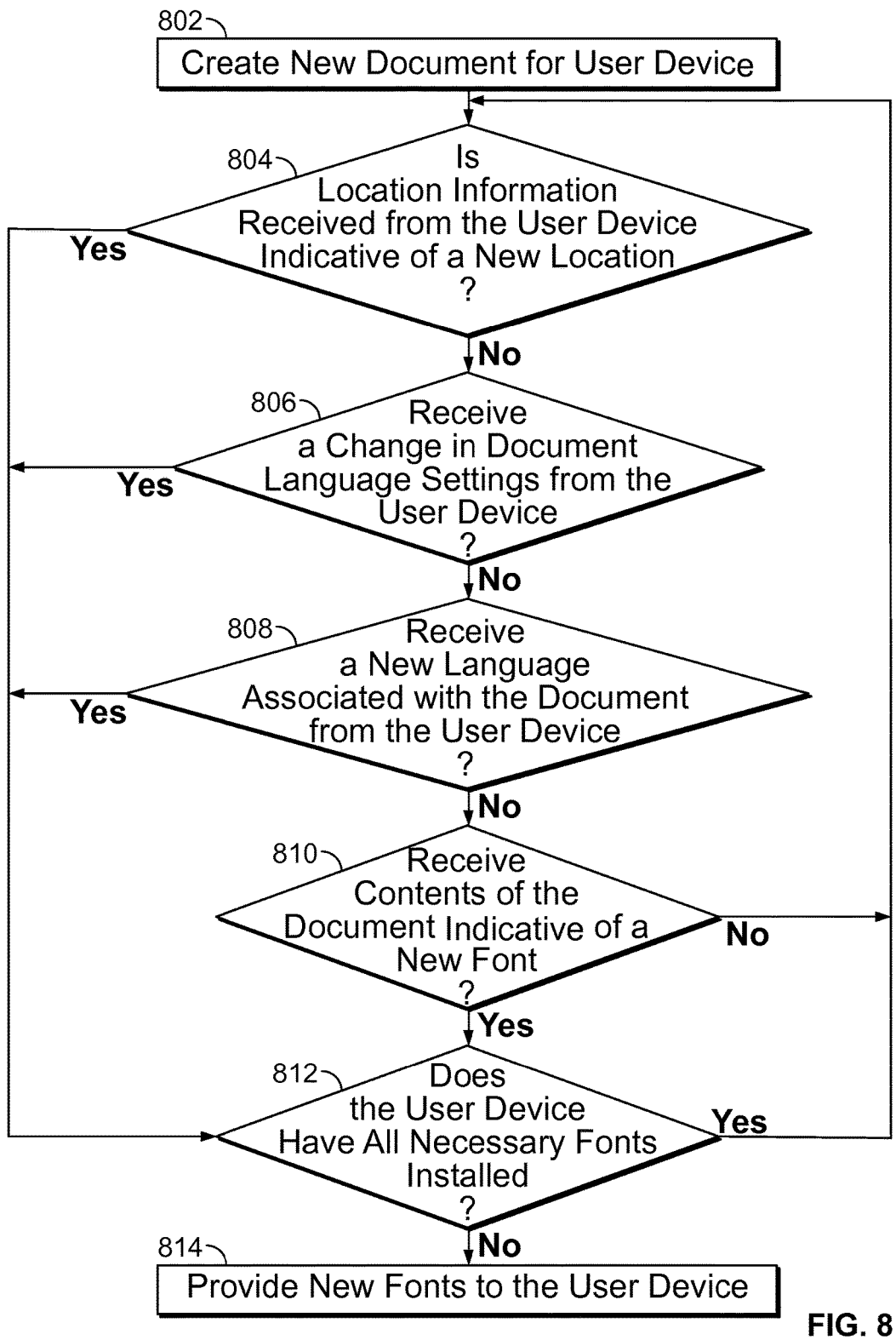
FIG. 8 is a flowchart of a method of providing fonts to a user device, in accordance with an embodiment.

FIG. 8 is a flowchart of a method of providing fonts to a user device, in accordance with an embodiment. These described parameters are used by server 104 to determine whether or not fonts are required by a user device.

At step 802, a new document is created for a user device. Server 104 creates document 310 for user device 106. Server 104 may receive a request for creating document 310, via network 102. Server 104 may require authentication (e.g., a login user name and associated password, etc.) of a user employing user device 106 prior to creating document 310.

At step 804, it is determined whether location information received from the user device is indicative of a new location. Server 104 determines whether or not location information received from user device 106 is indicative of a new location. Location information may be communicated to server 104 by user device 106, via network 102. For example, if user device 106, after logging into server 104 to create document 310, changes locations, the location information transmitted by user device 106 and received by server 104 would be indicative of a new location. User device 106 may use one of a multitude of methods to determine that the location of user device 106 has been updated or changed (e.g., by using GPS, etc.). In an embodiment, server 104 may compare the location information received from user device 106 during a previous session (e.g., the last time user device 106 logged onto server 104) with a current location information received from user device 106 in order to determine whether the location information is new.

In response to determining that the location information received from user device 106 is indicative of a new location (i.e., a "yes" response to the decision box in step 804), the flowchart continues to step 812 (described below). In response to determining that the location information received from user device 106 is not indicative of a new location (i.e., a "no" response to the decision box in step 804), the flowchart continues to step 806.

At step 806, a determination is made whether a change in document language settings is received from the user device. Server 104 determines whether a change in document language settings is received from user device 106. The change in document language settings may be set by a user employing user device 106 and sent to server 104, via network 102. The change in document language settings may occur, for example, when a user selects a new document language setting in a view, as shown in FIG. 6.

In an embodiment, when the document's language setting is changed, the font menu within a document may be dynamically changed. This may be implemented for a subset of languages (e.g., Arabic, Hindi, Hebrew, Japanese, Korean, Thai, and Chinese). A user may be allowed to use web fonts from the font directory based on the document's language.

In response to determining that a change in document language settings is received from user device 106 (i.e., a "yes" response to the decision box in step 806), the flowchart continues to step 812 (described below). In response to determining that change in document language settings is not received from user device 106 (i.e., a "no" response to the decision box in step 806), the flowchart continues to step 808.

At step 808, a determination is made whether a new language associated with the document is received from the user device. Server 104 determines whether a new language associated with document 310 is received from the user device 106. The new language associated with document 310 may be set by a user employing user device 106 and sent to server 104, via network 102. The new language may be manually entered by a user employing user device 106 or may be automatically detected by user device 106, which communicates the new language to server 104. For example, the user may indicate that he/she wishes to include fonts associated with a new language that are not accessible by user device 106. Alternatively, device 106 may detect the need for new fonts associated with a new language when user device 106 changes geographic locations.

In response to determining that a new language associated with document 310 is received from user device 106 (i.e., a "yes" response to the decision box in step 808), the flowchart continues to step 812 (described below). In response to determining that a new language associated with document 310 is not received from user device 106 (i.e., a "no" response to the decision box in step 808), the flowchart continues to step 810.

At step 810, a determination is made whether contents of the document indicative of a new font are received. Server 104 determines whether contents of document 310 indicative of a new font are received from the user device 106. Server 104 may determine whether contents of document 310 are indicative of a new font using several methods. For example, server 104 may detect whether a user employing user device 106 has copied items in a new font onto a clipboard. Server 104 may receive an indication from user device 106 of new hardware equipment (e.g., the installation of a Chinese language keyboard, etc.) and a user employing user device 106 may begin typing content onto document 310, which may cause server 104 to determine that the content is indicative of a new font not available to user device 106.

In response to determining that contents of document 310 indicative of a new font are not received from user device 106 (i.e., a "no" response to the decision box in step 810), the flowchart returns to step 804.

In response to determining that contents of document 310 indicative of a new font are received from user device 106 (i.e., a "yes" response to the decision box in step 810), the flowchart continues to step 812. At step 812, a determination is made as to whether the user device has all necessary fonts installed. Server 104 makes a determination as to whether user device 106 has all necessary fonts installed. Server 104 may compare font list 245, received from user device 106, via network 102, to any new fonts needed as a result of any of the parameters indicated by steps 804, 806, 808, and 810. If server 104 determines that user device 106 has all the necessary fonts installed (i.e., a "yes" response to the decision box in step 812), the flowchart returns to step 804. If however, server 104 determines that some necessary fonts are not listed in font list 245 (i.e., a "no" response to the decision box in step 812), the flowchart continues to step 814.

At step 814, new fonts are provided to the user device. Server 104 provides any new fonts not available to user device 106, via network 102. User device 106 may then locally download the fonts and render text entered in document 310 using the new fonts.

In an alternate embodiment, the user device determines which fonts are required and sends a request to the server to download the fonts.

In an embodiment, partial font sets are downloaded onto the user device. For example, a font may use the Latin alphabet and the Cyrillic alphabet. If it is determined by the server that the user is expected to use Cyrillic characters, only the Cyrillic alphabet of the font may be downloaded by the user device.

Steps 804, 806, 808, and 810 provide decision boxes for determining whether or not fonts are required. In an embodiment, one or more of the decision boxes in FIG. 8 may be used to determine whether fonts are required. However, it may not be necessary to perform all of the steps shown in FIG. 8. For example, a determination may be made that that contents of the document indicative of a new font are received, as shown in step 810, without the need to make any other determination. Furthermore, multiple determinations may be made (e.g., it may be determined whether a change in document language settings are received from the user device in step 806 and whether contents of the document indicative of a new font are received in step 810), while other determinations may not be made. In an embodiment where multiple determinations are made, a timer may be set before the determination in step 812 is made to ensure that responses to the multiple decision boxes are received prior to determining whether the device has all the necessary fonts installed. Therefore, one or more of the decisions indicated by the decision boxes in FIG. 8 may be performed. Additionally, after step 814, in an embodiment, the flowchart may return to any of the previous decision boxes.

Although the above description of FIG. 8 describes the server performing the steps of FIG. 8, in accordance with an embodiment, one or more of the steps shown in FIG. 8 may be performed by user device 106. For example, user device 106 may use logic stored therein to determine one or more of the decisions depicted in steps 804, 806, 808, 810, or 812. In response to determining that new fonts are needed, user device 106 may then request the new fonts from server 104.

Dynamically Loading Web Fonts Based on User Actions

In an embodiment, fonts may be loaded before the fonts are actually visible to the user. Pre-loading of fonts may prevent the font from being displayed incorrectly and then flickering as the true font loads.

The following describes some examples of pre-loading, pre-fetching, and/or optimistically fetching the necessary font.

Copy/paste: A user employing user device 106 may copy content from a webpage, document, web-based application (e.g., online email), etc. that the user wishes to paste into a document. The content may be rendered using a specific font. In an embodiment, user device 106 may not have the specific font cached locally on the user's browser (e.g., for use in an application used to edit document 310). If the user pastes the content into the document in the specific font, then the font may be loaded immediately from server 104 onto user device 106. In an embodiment, when the content is copied by the user, the content is added to a local clipboard. Upon detecting that there is an unavailable font on the clipboard (e.g., the font that is used to render text copied onto the clipboard is not made available to the user device editing document 310), server 104 may communicate with user device 106 regarding the unavailable font. User device 106 may send a request to server 104 to retrieve the font. User device 106 may communicate the name of the font. Server 104 receives the request, and, in response, transmits the requested font to user device 106. When user device 106 receives the font identified by the name of the font, user device 106 downloads the font. In case server 104 does not have access to the font, server 104 may retrieve the font from an external source prior to transmitting it to user device 106. After server 104 provides the font to user device 106, the device may cache the font locally before the user pastes the content. The user may then paste the content, which is rendered in the specific font by user device 106, as the device has locally stored the font. Therefore, user device 106 may be provided with the font before the user pastes the content. The retrieval of the font between the copying and pasting steps by the user may be performed substantially quickly and the user may not even realize that the specific font was unavailable to the user at any point.

Frequent use: If it is detected that a user has recently used a font in another document, the font may be adaptively downloaded onto the user's device such that the font is reused in the user's current document. The server may detect that the user has recently used a font in a different document. In another embodiment, the user's device may detect that the user has recently used the font in a different document, different application, different program, etc. In response, the device may communicate with the server and inform the server that the user has used the font. The server then locates and or retrieves the font (e.g., by accessing a database of fonts) and offers the font for download to the device. The device then download the font and stores it locally so that the user may use the font in a current document the user is creating, editing and/or viewing.

Loading for other applications: Some document applications support importing data from other files (e.g., import slides from another presentation into a user's current presentation). When the user selects a presentation containing slides to import, the fonts from that presentation may be loaded before the slides are loaded into the current presentation. The server may detect that the user has selected a presentation to import. In another embodiment, the user's device may communicate with the server to inform the server that the user has selected a presentation to import. The server may then automatically detect all the fonts associated with the presentation and perform a check to determine whether the fonts are stored on the user's device. In response to determining that one or more of the fonts are not stored on the user's device, the server may then offer the fonts for download onto the user's device. The user may then download the fonts onto his/her device and use the fonts.

Collaborator action: One or more collaborators may access a document. The collaborators may each view and/or collaboratively edit the document. The server, in response to receiving a request for a font from one of the collaborators, offers the font for download to the collaborator. If the server detects that the collaborator that has added the requested font to his/her font menu on his/her device and that the font is not available to one or more of the other collaborators, or that the collaborator is a frequent user of fonts that other collaborators do not have available, then those fonts may be loaded optimistically. In accordance with an embodiment, the server may communicate with each of the collaborators' devices at the same time or directly after offering the requested font for download to the collaborator requesting the font. As a result of this communication, the server determines whether or not the devices have the font stored locally.

In accordance with an embodiment, the collaborator's device may use logic stored therein to determine which fonts appear in the font menu based on the language of the document. The collaborator's device may then communicate to the server the fonts that are needed by the collaborator's device and the server may then transmit the necessary fonts.

In a collaborative editing environment, server 104 detects an action of a user employing user device 106-A relating to document editing or document processing. For example, server 104 may detect that a user has selected a "paste text" option to paste some content into the document being collaboratively edited and/or viewed. In another example, the server may detect that one collaborator (e.g., employing user device 106-B) among a plurality of collaborators has downloaded a particular font. In response to detecting the user action, the server identifies, optimistically, a particular user and a font that the user is likely to require. The particular user identified may be the same user who performed the detected action, or may be a different user. The server then downloads the identified font to the particular user's device. For example, when a user pastes text associated with a particular font, the server may download the particular font to that user's device. If a first collaborator among a plurality of collaborators downloads a particular font, the server may identify that a second collaborator's device does not have the particular font, and offer the particular font for downloading to the second collaborator's device. In an embodiment, the server may query the device to determine if the device already has the font saved. If the device does not have the font saved, the server then offers the font to the device for downloading.

Using these approaches advantageously allows a more intelligent manner of selecting which web fonts to download and/or cache onto a user's device. If the user requires access to a font to view a document, the seamless manner of retrieving the font is performed in such a way that the user may not even realize the font was at one time unavailable and was recently loaded. Therefore, the user may not perceive any difference in viewing a document containing characters rendered using a font that was locally cached versus characters rendered using a font that was not previously cached but was recently downloaded. In an embodiment, fonts are advantageously downloaded before a user needs or wants to access the fonts.

In an embodiment, fonts may be automatically downloaded based on a user's action. For example, if a user types a Hebrew character, the user's device my optimistically download one or more Hebrew language character font sets. In another embodiment, if the user's device has not yet fetched or downloaded the required fonts (or is in the process of fetching or downloading the fonts) needed to view a document, the user's device may provide the user with a warning indicating that the fonts are not available, that the fonts are currently being downloaded or asking permission of the user prior to downloading the fonts.

Figure 9:
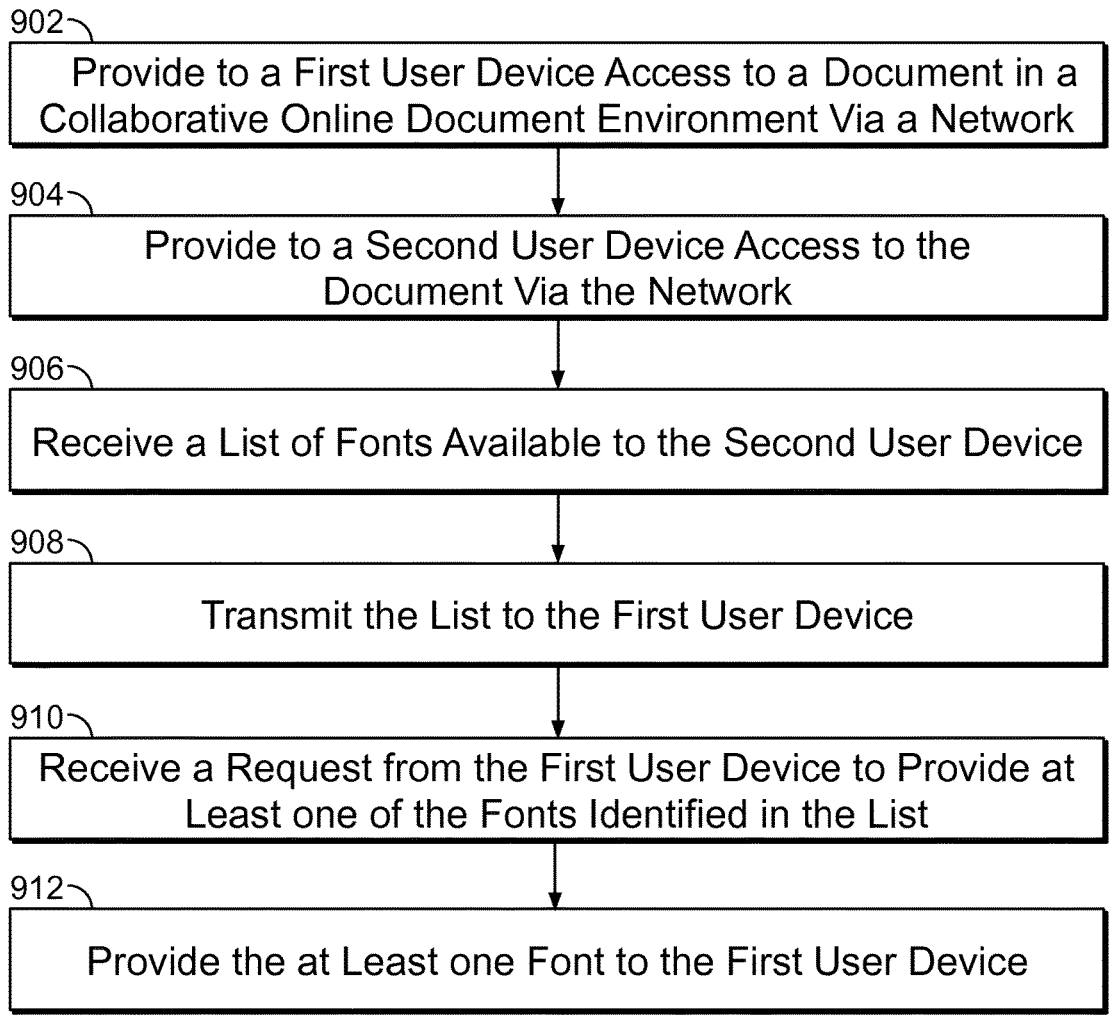
FIG. 9 is a flowchart of a method of providing fonts to collaborative users in a collaborative online development network in accordance with an embodiment.

FIG. 9 is a flowchart of a method of providing fonts to collaborative users in a collaborative online development network, in accordance with an embodiment. At step 902, a first user device is provided access to a document in a collaborative online document environment via a network. Server 104 (i.e., a collaborative development server) provides access to document 310 to user device 106-A (e.g., a first user device), via network 102. Prior to providing access to document 310, server 104 may require authentication (e.g., a login user name and associated password, etc.) of a user employing user device 106-A. In an embodiment, only in response to performing authentication of user device 106-A is user device 106-A provided with access to document 310. The user employing user device 106-A may be a creator of document 310 or may be a collaborator that is accessing document 310, which may be created by another collaborator.

At step 904, a second user device is provided access to the document in a collaborative online document environment via a network. Server 104 provides access to document 310 to user device 106-B (e.g., a second user device), via network 102. Prior to providing access to document 310, server 104 may require authentication (e.g., a login user name and associated password, etc.) of a user employing user device 106-B. In an embodiment, only in response to performing authentication of user device 106-B is user device 106-B provided with access to document 310. The user employing user device 106-B may be a creator of document 310 or may be a collaborator that is accessing document 310, which may be created by another collaborator.

As described herein below, user device 106-A stores a font list, which is referred herein to as font list 245-A, and user device 106-B stores a font list, which is referred herein to as font list 245-B.

At step 906, a list of fonts available to the second user device is received. Server 104 receives font list 245-B from user device 106-B, via network 102. In an embodiment, user device 106-B may transmit font list 245-B to server 104, via network 102, upon logging in to server 104 to access document 310. In an embodiment, user device 106-B may transmit font list 245-B every time at log in. In this way, server 104 can determine which fonts listed in font list 245-B are available to user device 106-B and when there is a change in font list 245-B (e.g., when fonts are added or removed from font list 245-B), server 104 keeps track of the change. In another embodiment, user device 106-B may be send font list 245-B periodically and/or on a scheduled basis to server 104. In another embodiment, user device 106-B, upon detecting a change in font list 245-B, may transmit font list 245-B to server 104.

Similar to user device 106-B, server 104 may also receive a font list from user device 106-A (e.g., upon user device 106-A logging in, etc.).

Upon receiving font list 245-B from user device 106-B, server 104 may compare font list 245-A belonging to user device 106-A with font list 245-A belonging to user device 106-B. In an alternate embodiment, server 104 may transmit user device 106-B's font list (i.e., font list 245-B) to user device 106-A, and user device 106-A may make a determination of whether to request fonts that are on the font list (i.e., font list 245-A) which are not available to user device 106-A. Details regarding the alternate embodiment are described herein with respect to the following steps of FIG. 9.

At step 908, the list is transmitted to the first user device. Server 104 transmits font list 245-B (which is the font list that belongs to user device 106-B) to user device 106-A, via network 102. User device 106-A, upon receiving font list 245-B, makes a comparison between stored font list 245-A and received font list 245-B. If all fonts listed in font list 245-B are already in font list 245-A, user device 106-A does not need to download any new fonts.

However, in an alternate embodiment, suppose that user device 106-A finds one or more new fonts listed in font list 245-B. User device 106-A then sends a request for the one or more new fonts. At step 910, a request is received from the first user device to provide at least some of the fonts identified in the list. Server 104 receives a request from user device 106-A, via network 102, to provide at least some of the fonts identified in font list 245-B which are not available to user device 106-A.

At step 912, the at least one font is provided to the first user device. Server 104 provides the at least one font to user device 106-A, via network 102. Server 104 may provide a font file that includes the font family, font glyphs, etc. to user device 106-A.

Upon downloading the at least one font, user device 106-A possesses the same fonts as user device 106-B. In this way, when user device 106-B is collaboratively editing document 310 and using any of a number of fonts listed in font list 245-B to render text entered in document 310, user device 106-A may also view the text rendered using any font available to user device 106-B. Server 104 may receive an updated list of fonts available to user device 106-A, wherein the updated list includes a name of the at least one font.

In an embodiment, user device 106-B may also communicate with server 104, via network 102, in order to receive font list 245-A. User device 106-B may then compare font list 245-B (stored locally) with font list 245-A to determine if there are any fonts listed in font list 245-A which are not available to user device 106-B.

In an alternate embodiment, server 104 may perform the comparison between the font lists belonging to different user devices to determine which user device requires fonts which are available to one user device and not available to another user device.

If a user device already has all the fonts that another user device has access to, then no additional fonts are needed by the user device.

In an embodiment, each time a collaborator accesses document 310, server 104 may communicate with the collaborator's user device to perform the steps described above with respect to FIG. 9.

In an embodiment, server 104 may communicate with all collaborator user devices in order to create a master list that is a superset of all available fonts on all collaborator user devices accessing document 310. Server 104 may then transmit the master list that is a superset of available fonts to each of the collaborator user devices so that each of the collaborator user devices can requests any fonts which are not locally available. Once all collaborator devices have downloaded all the fonts which are listed in the master list, whenever any collaborator edits and/or types into document 310, all collaborator devices can provide a proper view of the text rendered using any of the fonts listed in the master list.

Figure 10:
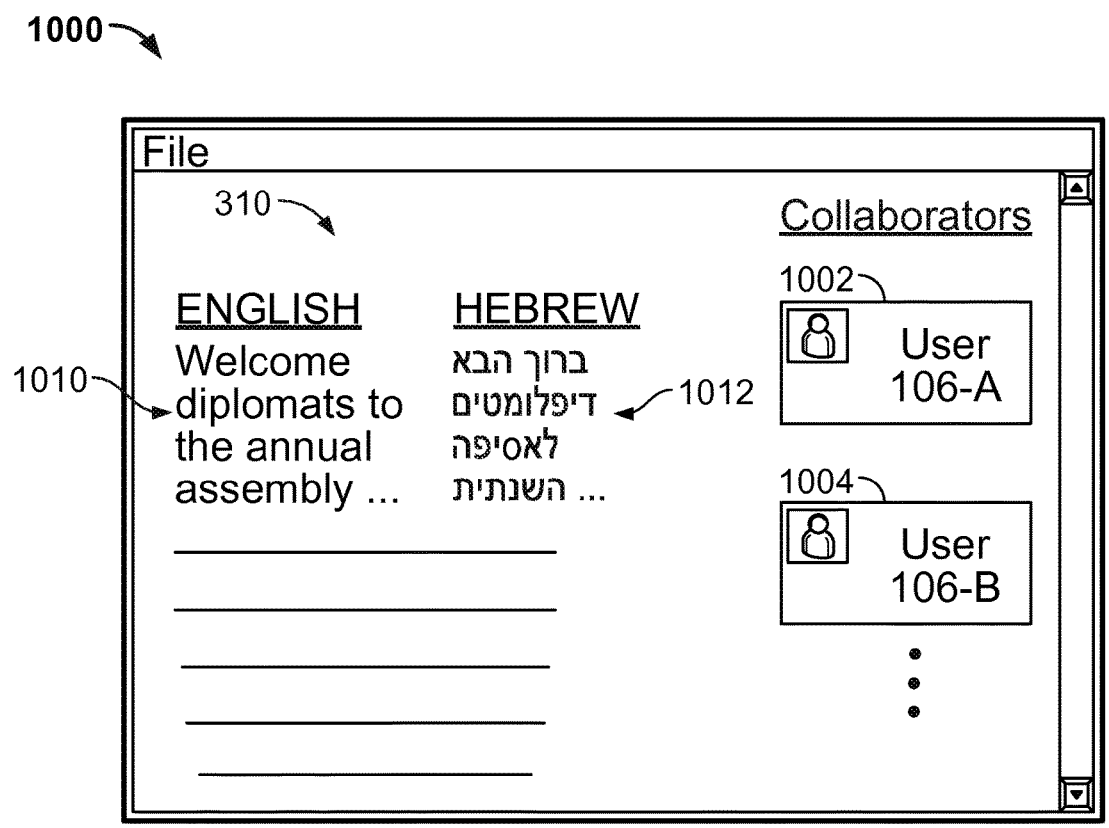
FIG. 10 depicts a view of a document being collaboratively edited, in accordance with an embodiment.

FIG. 10 depicts a view of a document being collaboratively edited, in accordance with an embodiment. Server 104 may receive commands from user device 106-A and user device 106-B to simultaneously edit the document. A view 1000 provides a view of document 310, displayable to a user employing user device 106. View 1000 may be displayed within a graphical user interface on display 220 of user device 106. View 1000 depicts a list of collaborators. The list of collaborators may include information related to the collaborators such as an avatar, an image, etc., an email address, a screen name, etc. associated with the user. Block 1002 shows information related to user 106-A and block 1004 shows information related to user 106-B.

Suppose now that two (or more) collaborators including user 106-A and user 106-B are viewing and/or editing document 310. For example, two (or more) users may be transcribing speeches made at an ambassadors' event onto document 310. User 106-A may be transcribing a speech into English by typing text 1010 rendered using an English language font. User 106-B may be transcribing the same speech into Hebrew by typing text 1012 rendered using a Hebrew language font. Other users may also be editing document 310 by adding text rendered in various types of fonts in a multitude of languages.

In order for user 106-A to view text 1012 entered into document 310, user device 106-A must have access to the Hebrew language font used by user 106-B to type text 1012. In an embodiment, when user 106-B employing user device 106-B logs into server 104 (after server 104 performs authentication of user 106-B and authenticates user 106-B), server 104 may receive a font list of all fonts (including Hebrew language fonts) that are available to user device 106-B. Server 104 may then transmit the font list to user device 106-A, so that user device 106-A may ensure that user device 106-A has access to all the fonts that are listed in the font list of user device 106-B.

In another embodiment, user 106-B may begin typing text onto document 310 where the font of the rendered text is a Hebrew language font. When the server receives the text entered by user 106-B, the server determines that user 106-B is rendering the text in a Hebrew language font. At that point, server 104 may transmit the Hebrew language font to user device 106-A. If the Hebrew language font is not available to user device 106-A, user device 106-A may download the font. In this way, as user 106-B is typing, user 106-A can view the text which is rendered using the proper Hebrew font.

In an embodiment, server 104 may receive commands from user device 106-A and user device 106-B (and other collaborator devices) to simultaneously edit the document.

Other collaborators of document 310 may download all the fonts used in document 310 onto their respective devices, if the fonts were previously unavailable. The collaborators may request the required fonts from server 104, which in turn would provide the fonts to collaborators so that they may all properly view the entered text rendered in the font that the collaborator typing the text had intended to be used to view the text. Suppose that a Russian transcriber joins in to edit document 310. Upon the Russian transcriber logging into server 104 (after authentication is performed and a determination is made that the Russian transcriber has been granted permission to view and/or edit document 310), all other collaborators are provided with Russian language fonts that are available to the Russian transcriber's device.

In an embodiment, when user 106-B logs into server 104, server 104 transmits document 310 to user device 106-B. In an embodiment, one cycle after user device 106-B loads document 310, user device 106-B transmits the font list to server 104.

Offline

In an embodiment, the user may be provided with access to a particular font (e.g., Fancy Français Font 305) even when user device 106 is offline. The particular font may be loaded onto user device 106 when the device is online, and may be used by the user at anytime (whether user device 106 is online or offline).

Suppose now that the user employing user device 106 is browsing the web and editing document 310, while user device is online. The user may copy some text (or image, graphics, etc. having embedded text) onto the clipboard. User device 106 may be online or offline when the user copies the text. Suppose that user device 106 copies the text when offline. When user device 106 goes back online, user device 106 may download the font used in the copied text by requesting the font from server 104, if the font is not available to use in editing document 310. Server 104 may transmit the font which may be stored in font database 350. When user device 106 download the font, the user may paste the text onto document 310 and the text is then rendered using the downloaded font. The font is then available for the user to use to edit document 310 regardless of whether or not user device 106 is in online or offline. In this way, user device 106 dynamically and intelligently selects fonts for downloading as needed (e.g., upon detecting of addition of text requiring a new font). Thus, user device 106 does not need to download a large amount of fonts which the user may or may not use. Rather, user device 106 is equipped with the fonts which the user utilizes.

An alternative approach to selectively loading the required fonts may be to load the web fonts that are in the document when the document is first loaded and to load fonts that the user explicitly requests in that session. More sophisticated approaches in documents and presentations may be implemented. Web-based editors may access web fonts to provide for greater numbers of fonts and to reduce any assumptions about fonts that are present in the document already.

Most applications that use web fonts may begin with a list of fonts. They may not provide mechanisms for the users to change their set of selected fonts as they are editing and they may not account for situations where collaborator actions may the set of loaded fonts to change. Selectively loading required fonts is beneficial over systems having static access to fonts that are saved locally.

Applications

In an embodiment, there may be a number of non-ideal behaviors if a language for a document is not specified. These include:

User may not control which language is used for spell-checking;

Certain fonts for certain users may not be shown; and

Text/messages in the document text may not be placed without knowing the language of the document. Or, the text/messages would render, even if the font did not have glyphs for that language, however, the text/messages may be unreadable (e.g., may not be decipherable and may appear as gibberish).

User Interface (UI) languages may address the above problems. However, in the case of collaborative document editing, the UI languages of different users in the same document may be different. Therefore, the concept of a "document language" to the model that is shared by all users is introduced.

The language setting may be provided in the file menu of the document processor. The file menu may provide a submenu 604 that lists all the languages. An example of the File menu and submenu is provided in a view FIG. 6. User device 106 may determine which sets of fonts correspond to a language selected in submenu 604. User device 106 may then determine if the font is stored locally and if a font is needed that is not stored locally, user device 106 may communicate with server 104, via network 102, to retrieve and cache the font.

According to an embodiment, switching the language setting may immediately switch the language for all users collaboratively editing/viewing the document.

In an embodiment, the setting may start as the default language from the document creator's locale. The setting may thus be set originally according to the default language for one or all of the users.

The setting may be used to control the following:

The language that spellchecking is executed in;

The language that is used when inserting text into the document (e.g., table of content title, table of content empty placeholder text, etc.); and The set of fonts that are displayed in the font dropdown menu.

For previously existing documents, the setting may default to null. Functionality that depends on this setting may be able to handle the null case. For example, if the setting is null:

Spellchecking may auto-detect the language of the document;

The table of content text maybe be in the language of the user's UI; and

The font dropdown may be the default English dropdown.

The default setting may be controlled by changing a user's UI locale. A user preference may indicate the default in-document language to be used whenever documents are created by that user. In an embodiment, a tools menu may provide access to the settings. In another embodiment, the document language setting may default to the locale of the collaborator that created the document (or the owner of the document) and may continue to be the locale of the collaborator until another collaborator with edit access changes the language setting via the menu to another language. In one embodiment, the language setting may change dynamically corresponding to the language of the collaborator editing the document. For example, if one collaborator is editing the document in German, the language setting may be set by the collaborator to German or may be set automatically by the document processor to German based on the collaborator's locale. If another collaborator then edits the document in Finnish, the language setting may then be changed to Finnish from German. The changing of the language setting may be automatic or manually set. The language setting may continuously and dynamically change based on the collaborators. In an embodiment, the language setting may be dependent upon permissions granted to the collaborators. For example, collaborators who have write access may automatically or manually change the language settings, whereas collaborators who only have read access may not be granted permission to change the language settings.

In an embodiment, spellchecking may be set to automatically detect spelling errors by default in one language and a user may force the spell check to change to another language for the duration of a session. Automatically detecting spelling errors in a language may perform spell checking of a document that contains words in multiple languages. In an embodiment, the spell checking feature may not be tied to the language setting of the document. In an embodiment, it may be possible to default back to spell checking in a default language if the language is not detected.

In an embodiment, necessary changes to allow for a language setting in a document may be determined. Having a language setting per document may allow things like spellchecking and language-specific fonts to appear correctly even if the user viewing it uses a different language. This language setting may default to the selected language of the document creator (for example, in the case of collaborative editing, where multiple editors from different countries and/or understanding different languages are collaborating together on a document).

A new language style may be created. It may contain an enumeration property for the language which may be used as the language setting.

For existing documents, this property may be null by default. For new documents, this property may be set to the document creator's locale (e.g., name.util.Config.PropertyName.LOCALE).

The class hierarchy may be:
name.protocol.LanguageStyle
language: @type {enum} (nullable)

View

The document may show spellchecking corrections in the chosen language. The loaded font styles may be based on the chosen language.

Commands

The language setting may be applied by a new command, ApplyLanguageStyleCommand.

Flag
enable_language

Menus/Dialog

The File Menu may have an item for Language and a sub-menu listing all the languages available. There may be a check mark next to the language that the document is set to.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein. Certain steps of the methods described herein may be performed by a server or by another processor in a network-based cloud-computing system. Certain steps of the methods described herein may be performed by a client computer in a network-based cloud computing system. The steps of the methods described herein may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 11:
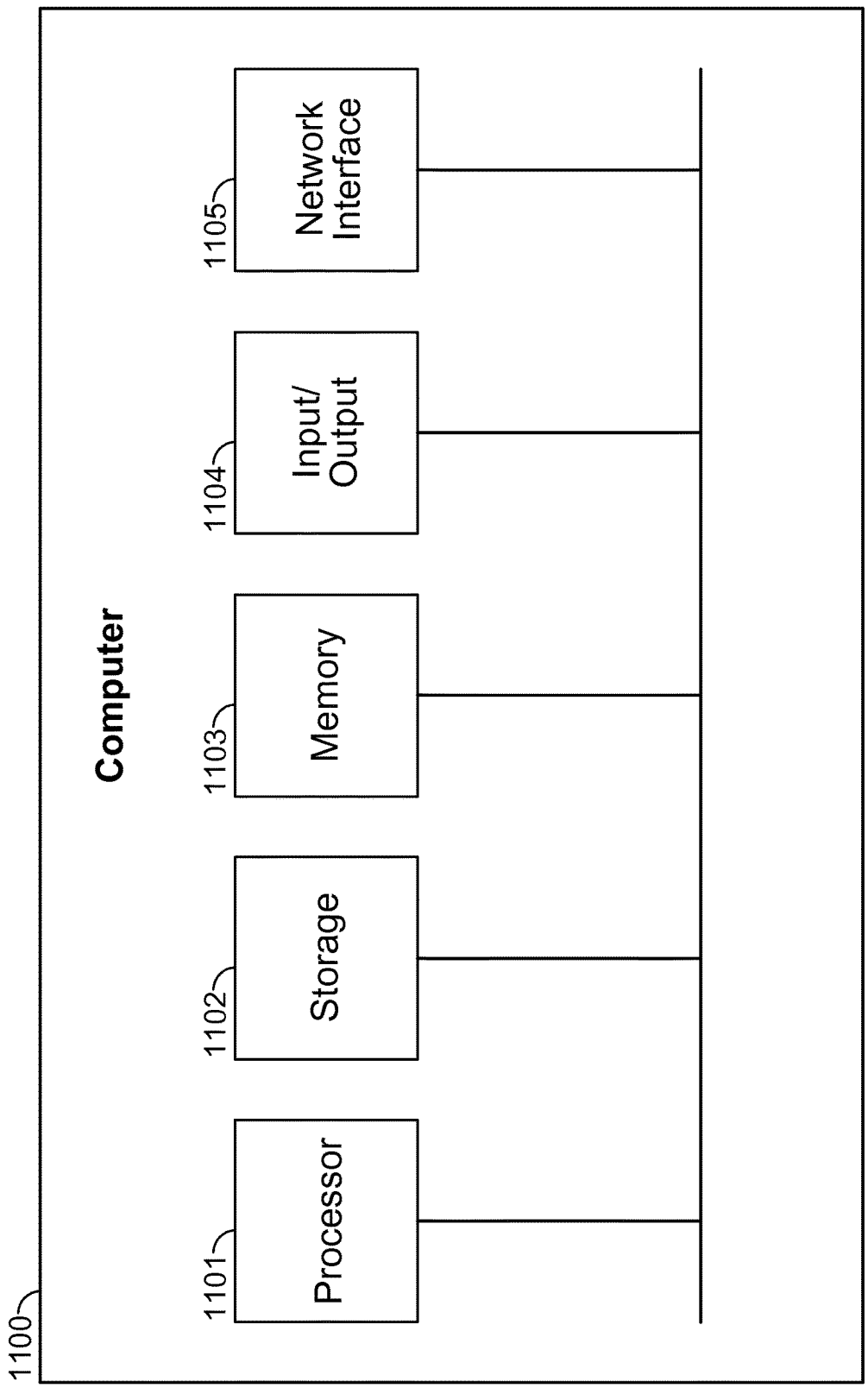
FIG. 11 shows components of a computer that may be used to implement certain embodiments.

A high-level block diagram of an exemplary computer that may be used to implement certain systems, apparatus and methods described herein is illustrated in FIG. 11. Computer 1100 includes a processor 1101 operatively coupled to a data storage device 1102 and a memory 1103. Processor 1101 controls the overall operation of computer 1100 by executing computer program instructions that define such operations. The computer program instructions may be stored in data storage device 1102, or other computer readable medium, and loaded into memory 1103 when execution of the computer program instructions is desired. Thus, the method steps described herein can be defined by the computer program instructions stored in memory 1103 and/or data storage device 1102 and controlled by the processor 1101 executing the computer program instructions. For example, the computer program instructions can be implemented as computer executable code programmed by one skilled in the art to perform an algorithm defined by the method steps described herein. Accordingly, by executing the computer program instructions, the processor 1101 executes an algorithm defined by the method steps described herein. Computer 1100 also includes one or more network interfaces 1104 for communicating with other devices via a network. Computer 1100 also includes one or more input/output devices 1105 that enable user interaction with computer 1100 (e.g., display, keyboard, mouse, speakers, buttons, etc.).

Processor 1101 may include both general and special purpose microprocessors, and may be the sole processor or one of multiple processors of computer 1100. Processor 1101 may include one or more central processing units (CPUs), for example. Processor 1101, data storage device 1102, and/or memory 1103 may include, be supplemented by, or incorporated in, one or more application-specific integrated circuits (ASICs) and/or one or more field programmable gate lists (FPGAs).

Data storage device 1102 and memory 1103 each include a tangible non-transitory computer readable storage medium. Data storage device 1102, and memory 1103, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1105 may include peripherals, such as a printer, scanner, display screen, etc. For example, input/output devices 1105 may include a display device such as a cathode ray tube (CRT) or liquid crystal display (LCD) monitor for displaying information to the user, a keyboard, and a pointing device such as a mouse or a trackball by which the user can provide input to computer 1100.

Any or all of the systems and apparatus discussed herein, including server 104, user device 106, display 220, memory 240, processor 375, memory 325, font database 350, and components thereof, may be implemented using a computer such as computer 1100.

One skilled in the art will recognize that an implementation of an actual computer or computer system may have other structures and may contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   providing to a user device access to a document via a network;
   receiving an indication of a first locale of the user device, the first locale being associated with a first language;
   detecting an update to a language associated with the document in response to receiving an indication that the locale of the user device has changed, since the last time the user device accessed the document, from the first locale to a second locale, the second locale being different from the first locale and being associated with a second language different from the first language;
   determining fonts associated with the update to the language;
   comparing the fonts determined to be associated with the update to the language to a font list received from the user device to determine that at least one of the fonts associated with the update to the language is not available on the user device; and
   providing the at least one of the fonts associated with the update to the language that is not available on the user device to the user device,
   wherein when text is added to the document by a second user device that is coupled to the user device via the network, during simultaneous editing of the document by the user device and the second user device, and the text is indicative of a font that is not available on the user device, the method further comprises providing the font to the user device.

2. The method of claim 1, wherein the step of providing the at least one of the fonts to the user device comprises providing a font file associated with the at least one of the fonts, wherein the font file comprises a set of glyphs, characters, or symbols.

3. The method of claim 1, further comprising one of:
determining new fonts associated with the update to the language;
determining that at least one of the new fonts is not available on the user device; and
providing the at least one of the new fonts to the user device.

4. An apparatus comprising:
a processor; and
a memory communicatively coupled to the processor, the memory to store computer program instructions, the computer program instructions when executed on the processor cause the processor to perform operations comprising:
providing to a user device access to a document via a network;
receiving an indication of a first locale of the user device, the first locale being associated with a first language;
detecting an update to a language associated with the document in response to receiving an indication that the locale of the user device has changed, since the last time the user device accessed the document, from the first locale to a second locale, the second locale being different from the first locale and being associated with a second language different from the first language;
determining fonts associated with the update to the language;
comparing the fonts determined to be associated with the update to the language to a font list received from the user device to determine that at least one of the fonts associated with the update to the language is not available on the user device; and
providing the at least one of the fonts associated with the update to the language that is not available to on the user device to the user device,
wherein when text is added to the document by a second user device that is coupled to the user device via the network, during simultaneous editing of the document by the user device and the second user device, and the text is indicative of a font that is not available on the user device, the operations further comprise providing the font to the user device.

5. The apparatus of claim 4, wherein the operations for providing the at least one of the fonts to the user device comprises providing a font file associated with the at least one of the fonts, wherein the font file comprises a set of glyphs, characters, or symbols.

6. The apparatus of claim 4, the operations further comprising:
receiving a new locale of the user device;
detecting a new update to the language associated with the document;
determining new fonts associated with the update to the language;
determining that at least one of the new fonts is not available on the user device; and
providing the at least one of the new fonts to the user device.

7. A non-transitory computer readable medium, which, when executed on a processor, cause the processor to perform operations comprising:
receiving a first indication of a first locale of a user device, the first locale being associated with a first language;
receiving a second indication of a second locale of the user device;
detecting an update to a language associated with a document in response to the receiving the second indication, the second indication indicating that the locale of the user device has changed, since the last time the user device accessed the document, from the first locale to the second locale, the second locale being different from the first locale and being associated with a second language different from the first language;
determining new fonts associated with the update to the language;
comparing the fonts determined to be associated with the update to the language to a font list received from the user device to determine that at least one of the new fonts associated with the update to the language is not available on the user device; and
providing the at least one of the new fonts associated with the update to the language that is not available on the user device to the user device,
wherein when text is added to the document by a second user device that is coupled to the user device via a network, during simultaneous editing of the document by the user device and the second user device, and the text is indicative of a font that is not available on the user device, the operations further comprise providing the font to the user device.

8. The non-transitory computer readable medium of claim 7, wherein the operations for providing the at least one of the fonts to the user device comprises providing a font file associated with the at least one of the fonts, wherein the font file comprises a set of glyphs, characters, or symbols.

* * * * *